(12) United States Patent
Ohashi et al.

(10) Patent No.: US 12,073,515 B2
(45) Date of Patent: Aug. 27, 2024

(54) INFORMATION PROCESSING APPARATUS, DISPLAY SYSTEM, DISPLAY METHOD, AND NON-TRANSITORY COMPUTER READABLE MEDIUM STORING PROGRAM

(71) Applicant: NEC Corporation, Tokyo (JP)

(72) Inventors: Kazunori Ohashi, Tokyo (JP); Eiki Watanabe, Tokyo (JP); Nobuyuki Minagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 17/442,804

(22) PCT Filed: Jan. 14, 2020

(86) PCT No.: PCT/JP2020/000895
§ 371 (c)(1),
(2) Date: Sep. 24, 2021

(87) PCT Pub. No.: WO2020/195021
PCT Pub. Date: Oct. 1, 2020

(65) Prior Publication Data
US 2022/0254109 A1 Aug. 11, 2022

(30) Foreign Application Priority Data
Mar. 28, 2019 (JP) .................................. 2019-064637

(51) Int. Cl.
*G06T 19/00* (2011.01)
*G06T 7/70* (2017.01)
(52) U.S. Cl.
CPC .............. *G06T 19/006* (2013.01); *G06T 7/70* (2017.01)
(58) Field of Classification Search
CPC ........... G06T 19/006; G06T 7/70; G06T 7/75; G06T 19/00
See application file for complete search history.

(56) References Cited

U.S. PATENT DOCUMENTS

| 2005/0174361 | A1 | 8/2005 | Kobayashi et al. |
| 2015/0077592 | A1 | 3/2015 | Fahey |

(Continued)

FOREIGN PATENT DOCUMENTS

| CN | 101262830 A | * | 9/2008 | ............. A61B 90/36 |
| CN | 104427230 A | * | 3/2015 | ............. H04N 5/232 |

(Continued)

OTHER PUBLICATIONS

International Search Report for PCT Application No. PCT/JP2020/000895, mailed on Mar. 3, 2020.

(Continued)

*Primary Examiner* — Ryan R Yang

(57) ABSTRACT

An information processing apparatus includes a model-space storage unit that stores a 3D (three-dimensional) model of a predetermined object present in a real space, an object-information acquisition unit that acquires an image of the object taken by a camera of an augmented-reality display apparatus, a relation specifying unit that specifies a correspondence relation between a model coordinate system and a real-space coordinate system based on a result of a comparison between the image and the 3D model, a transformation unit that transforms coordinates in the model coordinate system for specifying a position at which a predetermined image is displayed into coordinates in the real-space coordinate system by using the correspondence relation, and a coordinate notification unit that notifies the augmented-reality display apparatus of the coordinates transformed by the transformation means.

5 Claims, 13 Drawing Sheets

(56) References Cited

U.S. PATENT DOCUMENTS

| | | | | |
|---|---|---|---|---|
| 2015/0310666 A1* | 10/2015 | Meier | ............... | H04N 5/2224 |
| | | | | 345/420 |
| 2016/0317623 A1* | 11/2016 | Shen | ............... | A61P 43/00 |
| 2018/0185100 A1 | 7/2018 | Weinstein et al. | | |
| 2018/0303558 A1* | 10/2018 | Thomas | ............... | A61B 34/20 |
| 2019/0005725 A1 | 1/2019 | Oonishi | | |
| 2019/0318504 A1* | 10/2019 | Kozaki | ............... | G06T 15/20 |
| 2019/0354799 A1* | 11/2019 | Ulbricht | ............... | G06T 7/33 |
| 2020/0107004 A1* | 4/2020 | Hayashi | ............... | H04N 13/122 |
| 2020/0184726 A1* | 6/2020 | Jo | ............... | G02B 27/0172 |
| 2020/0401806 A1* | 12/2020 | Nakamura | ............... | G06F 3/147 |

FOREIGN PATENT DOCUMENTS

| | | | | |
|---|---|---|---|---|
| CN | 106791784 A * | 5/2017 | ............ | G06T 3/005 |
| EP | 2189945 A1 * | 5/2010 | ............ | G06V 10/24 |
| JP | 2005-227876 A | 8/2005 | | |
| JP | 2012-168798 A | 9/2012 | | |
| JP | 2017-016202 A | 1/2017 | | |
| JP | 2018128815 A * | 8/2018 | ............ | G06T 19/00 |
| JP | 2018-163466 A | 10/2018 | | |
| JP | 2019-012342 A | 1/2019 | | |
| KR | 20150001580 A * | 1/2015 | ............ | G06T 15/50 |

OTHER PUBLICATIONS

Extended European Search Report for EP Application No. EP20778754.0 dated on Apr. 8, 2022.

Cheng Irene et al: "An augmented reality framework for optimization of computer assisted navigation in endovascular surgery", 2014 36th Annual International Conference of the IEEE Engineering in Medicine and Biology Society, Aug. 26, 2014.

Cunningham Dr Steve: "Notes for a Computer Graphics Programming Course", Jan. 1, 2001.

Japanese Office Communication for JP Application No. 2021-508106 mailed on Sep. 13, 2022 with English Translation.

\* cited by examiner

INFORMATION PROCESSING APPARATUS, DISPLAY SYSTEM, DISPLAY METHOD, AND NON-TRANSITORY COMPUTER READABLE MEDIUM STORING PROGRAM

This application is a National Stage Entry of PCT/JP2020/000895 filed on Jan. 14, 2020, which claims priority from Japanese Patent Application 2019-064637 filed on Mar. 28, 2019, the contents of all of which are incorporated herein by reference, in their entirety.

TECHNICAL FIELD

The present invention relates to an information processing apparatus, a display system, a display method, and a program.

BACKGROUND ART

Technologies for augmented reality (AR: Augmented Reality) have been increasingly developed in recent years. For example, Patent Literature 1 discloses a drawing projection system for projecting drawing information in a real space by using the AR technology.

It should be noted that in marker-less type AR such as PTAM (Parallel Tracking and Mapping), the position at which an AR image, which is an image displayed in a real scene while being superimposed thereon, is displayed is specified by spatially recognizing a specific object(s) by using a depth sensor or the like. One of the advantages of the marker-less type AR is that there is no need to prepare a special marker, so that AR can be displayed even in a situation where it is difficult to set a marker.

CITATION LIST

Patent Literature

Patent Literature 1: Japanese Unexamined Patent Application Publication No. 2018-163466

SUMMARY OF INVENTION

Technical Problem

In the marker-less type AR, it is necessary to acquire a number of feature points of the aforementioned specific object in order to recognize the object. Therefore, it is difficult to perform AR displaying at a place from which it is difficult to acquire feature points, for example, at a large place such as a sport venue, or to perform AR displaying at a distant place. That is, in the marker-less type AR displaying, in some cases, it is difficult to display an AR image at a desired position.

One of the objects of example embodiments disclosed in this specification are intended to achieve is to provide an information processing apparatus, a display system, a display method, and a program capable of appropriately displaying an AR image at a desired position in marker-less type AR displaying.

Solution to Problem

An information processing apparatus according to a first aspect includes:
model-space storage means for storing a 3D (three-dimensional) model of a predetermined object present in a real space;
object-information acquisition means for acquiring an image of the object taken by a camera of an augmented-reality display apparatus;
relation specifying means for specifying a correspondence relation between a model coordinate system and a real-space coordinate system based on a result of a comparison between the image and the 3D model, the model coordinate system being a coordinate system in a model space in which the 3D model is present, and the real-space coordinate system being a coordinate system in a real space managed by the augmented-reality display apparatus;
transformation means for transforming coordinates in the model coordinate system for specifying a position at which a predetermined image is displayed into coordinates in the real-space coordinate system by using the correspondence relation specified by the relation specifying means; and
coordinate notification means for notifying the augmented-reality display apparatus of the coordinates transformed by the transformation means.

A display system according to a second aspect includes:
an augmented-reality display apparatus including a camera; and
an information processing apparatus, in which
the information processing apparatus includes:
model-space storage means for storing a 3D model of a predetermined object present in a real space;
object-information acquisition means for acquiring an image of the object taken by the camera;
relation specifying means for specifying a correspondence relation between a model coordinate system and a real-space coordinate system based on a result of a comparison between the image and the 3D model, the model coordinate system being a coordinate system in a model space in which the 3D model is present, and the real-space coordinate system being a coordinate system in a real space managed by the augmented-reality display apparatus;
transformation means for transforming coordinates in the model coordinate system for specifying a position at which a predetermined image is displayed into coordinates in the real-space coordinate system by using the correspondence relation specified by the relation specifying means; and
coordinate notification means for notifying the augmented-reality display apparatus of the coordinates transformed by the transformation means, and
the augmented-reality display apparatus includes display control means for displaying the predetermined image in an augmented-reality manner based on the coordinates notified from the coordinate notification means.

A display method according to a third aspect includes:
acquiring an image of a predetermined object present in a real space taken by a camera of an augmented-reality display apparatus;
specifying a correspondence relation between a model coordinate system and a real-space coordinate system based on a result of a comparison between the image and a 3D model of the object, the model coordinate system being a coordinate system in a model space in which the 3D model is present, and the real-space coordinate system being a coordinate system in a real space managed by the augmented-reality display apparatus;

transforming coordinates in the model coordinate system for specifying a position at which a predetermined image is displayed into coordinates in the real-space coordinate system by using the correspondence relation; and notifying the augmented-reality display apparatus of the transformed coordinates.

A program according to a fourth aspect causes a computer to perform:

an object-information acquisition step of acquiring an image of a predetermined object present in a real space taken by a camera of an augmented-reality display apparatus;

a relation specifying step of specifying a correspondence relation between a model coordinate system and a real-space coordinate system based on a result of a comparison between the image and a 3D model of the object, the model coordinate system being a coordinate system in a model space in which the 3D model is present, and the real-space coordinate system being a coordinate system in a real space managed by the augmented-reality display apparatus;

a transformation step of transforming coordinates in the model coordinate system for specifying a position at which a predetermined image is displayed into coordinates in the real-space coordinate system by using the correspondence relation; and a notification step of notifying the augmented-reality display apparatus of the transformed coordinates.

Advantageous Effects of Invention

According to the above-described aspects, it is possible to provide an information processing apparatus, a display system, a display method, and a program capable of appropriately displaying an AR image at a desired position in marker-less type AR displaying.

DESCRIPTION OF EMBODIMENT

Figure 1:
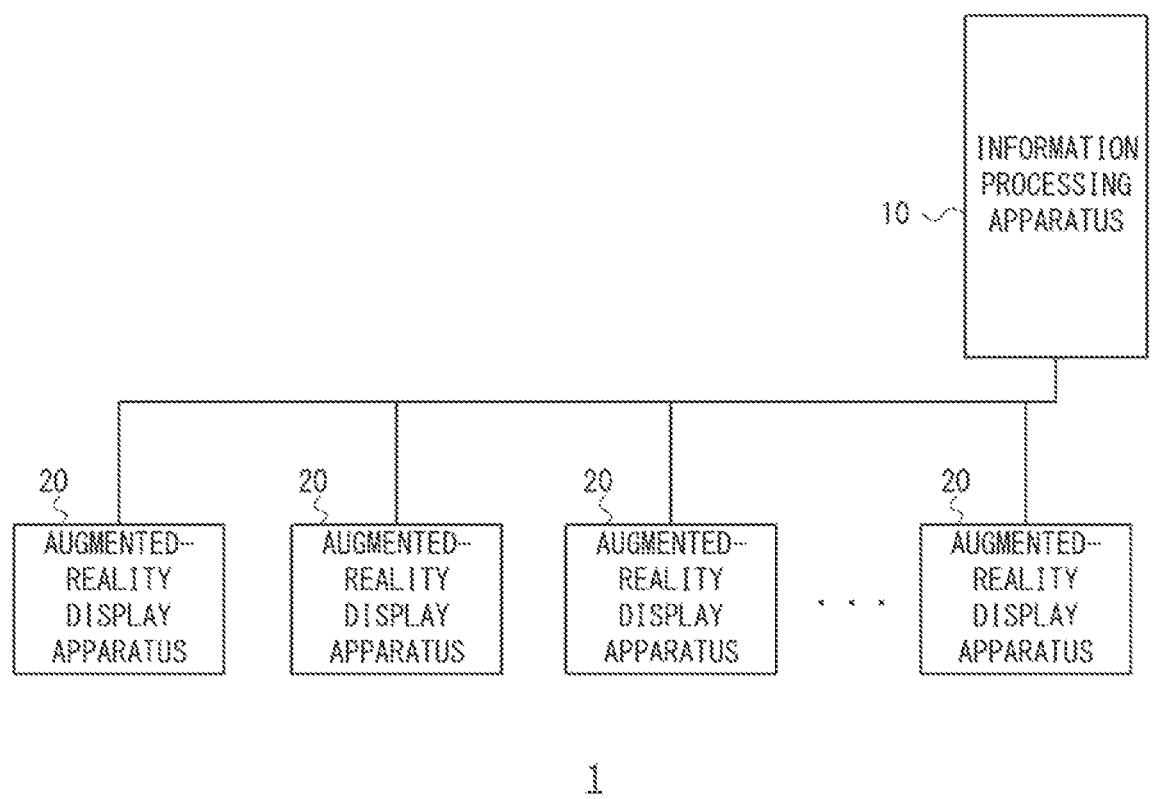
FIG. 1 is a block diagram showing an example of a configuration of a display system according to a first example embodiment.

Example embodiments according to the present invention will be described hereinafter with reference to the drawings. Note that the same elements are denoted by the same reference numerals (or symbols), and redundant descriptions thereof are omitted as appropriate.

FIRST EXAMPLE EMBODIMENT

FIG. 1 is a block diagram showing an example of a configuration of a display system 1 according to a first example embodiment. As shown in FIG. 1, the display system 1 includes an information processing apparatus 10, and at least one augmented-reality display apparatus 20. The information processing apparatus 10 is connected to the augmented-reality display apparatuses 20 through cables or wirelessly so that they can communicate with each other.

Each of the augmented-reality display apparatuses 20 is an apparatus that displays an AR image such as CG (Computer Graphics) in a real space (a real scene) in a superimposed manner. The augmented-reality display apparatus 20 is, for example, a head-mounted display such as a HoloLens (Registered Trademark) of Microsoft Corporation. The augmented-reality display apparatus 20 provides marker-less type AR displaying to a user.

Figure 2:
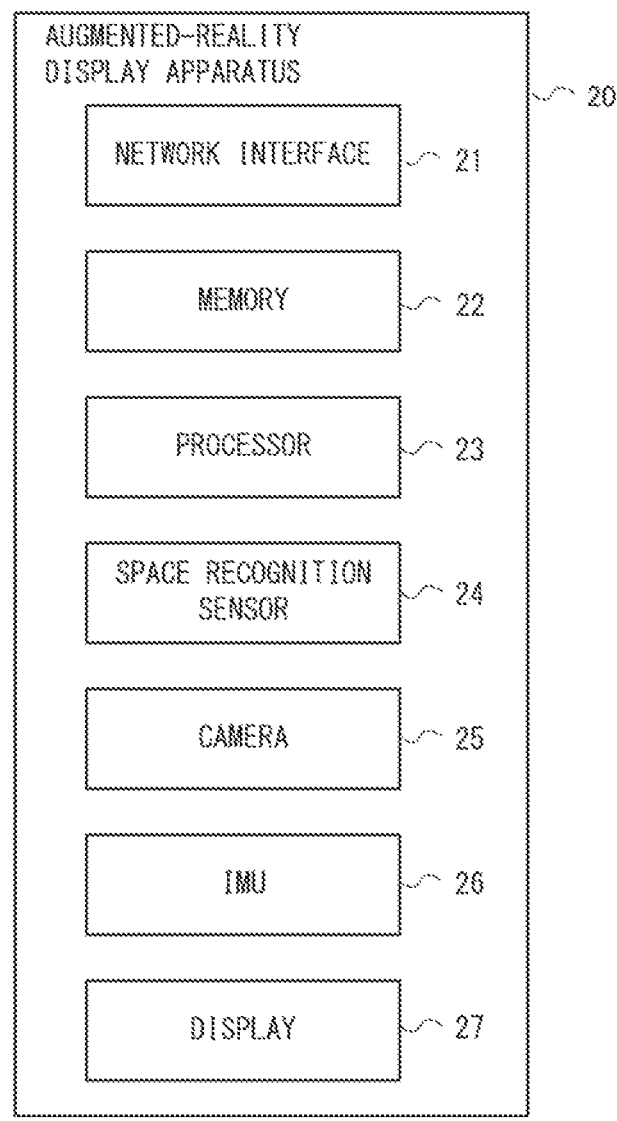
FIG. 2 is a schematic diagram showing an example of a hardware configuration of an augmented-reality display apparatus according to the first example embodiment.

FIG. 2 is a schematic diagram showing an example of a hardware configuration of the augmented-reality display apparatus 20. As shown in FIG. 2, the augmented-reality display apparatus 20 includes, for example, a network interface 21, a memory 22, a processor 23, a space recognition sensor 24, a camera 25, an IMU (Inertial Measurement Unit) 26, and a display 27.

The network interface 21 is used to communicate with other apparatuses such as the information processing apparatus 10. The network interface 21 may include, for example, a network interface card (NIC).

The memory 22 is formed by, for example, a combination of a volatile memory and a non-volatile memory. The memory 22 is used to store software (a computer program(s)) including at least one instruction executed by the processor 23 and various data necessary for the processing of the augmented-reality display apparatus 20. Note that the augmented-reality display apparatus 20 may include a storage device such as a hard disk drive in addition to the memory 22.

The processor 23 performs the processing of elements shown in FIG. 4 (which will be described later) by loading software (a computer program(s)) from the memory 22 and executes the loaded software. As described above, the augmented-reality display apparatus 20 has a function as a computer. The processor 23 may be, for example, a microprocessor, a MPU (Micro Processor Unit), or a CPU (Central Processing Unit). The processor 23 may include a plurality of processors.

The space recognition sensor 24 is a sensor for recognizing a real space. Specifically, the space recognition sensor 24 is, for example, a depth sensor and acquires information about distances in a real space.

The camera 25 photographs a real space. That is, the camera 25 photographs a scene in a real space in the field of view of the user of the augmented-reality display apparatus 20.

The IMU (Inertial Measurement Unit) 26 includes a gyroscope and an accelerometer, and is used to detect the position and the orientation of the augmented-reality display apparatus 20 (the camera 25).

The display 27 is an apparatus that displays an AR image in a scene in a real space in a superimposed manner. The display 27 may be, for example, an optical transmission type display device composed of a micro-display and a half mirror. Further, the display 27 may be a video transmission type display device that displays an image that is obtained by combining a real-time image taken by the camera 25 and an AR image.

The information processing apparatus 10 is an apparatus that notifies the augmented-reality display apparatus 20 of coordinates in an augmented reality space for specifying a position at which an AR image is displayed. The information processing apparatus 10 is, for example, a server such as an MEC (Mobile Edge Computing) server.

Figure 3:
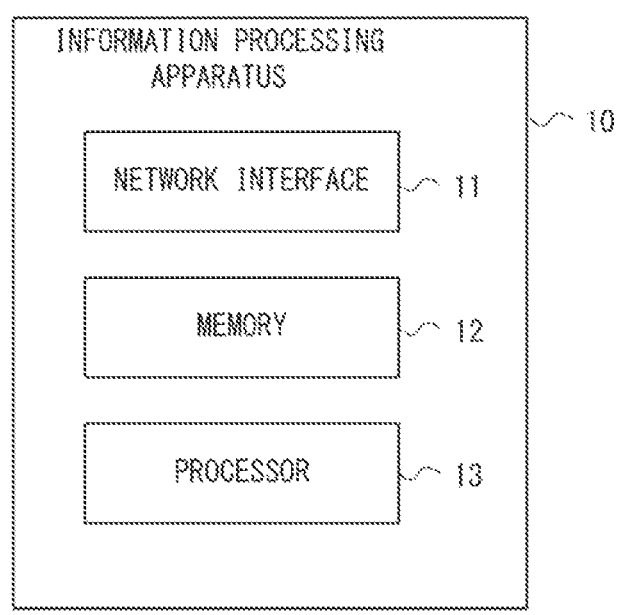
FIG. 3 is a schematic diagram showing an example of a hardware configuration of an information processing apparatus according to the first example embodiment.

FIG. 3 is a schematic diagram showing an example of a hardware configuration of the information processing apparatus 10. As shown in FIG. 3, the information processing apparatus 10 includes, for example, a network interface 11, a memory 12, and a processor 13.

The network interface 11 is used to communicate with other apparatuses such as the augmented-reality display apparatuses 20. The network interface 11 may include, for example, a network interface card (NIC).

The memory 12 is formed by, for example, a combination of a volatile memory and a non-volatile memory. The memory 12 is used to store software (a computer program(s)) including at least one instruction executed by the processor 13 and various data necessary for the processing of the information processing apparatus 10. Note that the information processing apparatus 10 may include a storage device such as a hard disk drive in addition to the memory 12.

The processor 13 performs the processing of elements shown in FIG. 5 (which will be described later) by loading software (a computer program(s)) from the memory 12 and executes the loaded software. As described above, the information processing apparatus 10 has a function as a computer. The processor 13 may be, for example, a microprocessor, an MPU, or a CPU. The processor 13 may include a plurality of processors.

Further, the above-described program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Figure 4:
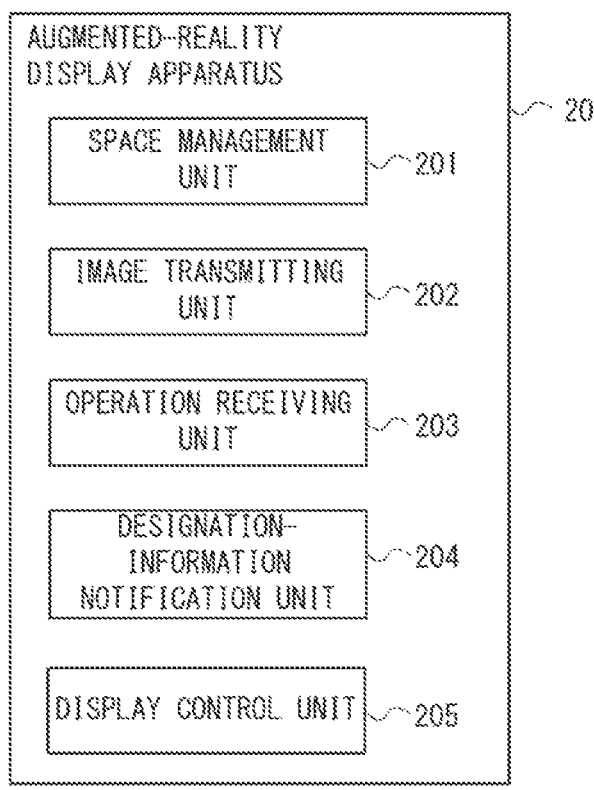
FIG. 4 is a block diagram showing an example of a functional configuration of the augmented-reality display apparatus according to the first example embodiment.

FIG. 4 is a block diagram showing an example of a functional configuration of the augmented-reality display apparatus 20. As shown in FIG. 4, the augmented-reality display apparatus 20 includes a space management unit 201, an image transmission unit 202, an operation receiving unit 203, a designation-information notification unit 204, and a display control unit 205. The processing of each of the space management unit 201, the image transmission unit 202, the operation receiving unit 203, the designation-information notification unit 204, and the display control unit 205 is implemented by, for example, having the processor 23 execute a program.

The space management unit 201 manages a coordinate system in a real space based on output information of the space recognition sensor 24 and the IMU 26. For example, the space management unit 201 manages coordinates in the aforementioned coordinate system corresponding to a position at which the augmented-reality display apparatus 20 (the camera 25) is present in the real space. Further, the space management unit 201 manages a direction (i.e., a vector) in the aforementioned coordinate system corresponding to a direction in which the augmented-reality display apparatus 20 (the camera 25) faces in the real space. Further, for example, the space management unit 201 manages coordinates in the aforementioned coordinate system corresponding to a position of an object present in the real space.

For example, in the case of the HoloLens of Microsoft Corporation, the position of the camera at the time when its application is started becomes the origin, and the directions of the coordinate axes are determined based on the direction in which the camera faces at the time.

Note that the coordinate system managed by the space management unit 201 is referred to as a real-space coordinate system.

The image transmission unit 202 transmits the image taken by the camera 25 to the information processing apparatus 10. Note that the image transmission unit 202 transmits, together with the image, the coordinates and the direction of the camera 25 managed by the space management unit 201 to the information processing apparatus 10.

The operation receiving unit 203 receives an operation from the user of the augmented-reality display apparatus 20. For example, the operation receiving unit 203 receives an input operation from the user by detecting a predetermined action such as air tapping performed by the user based on output information from the space recognition sensor 24 or the camera 25. Note that the air tapping is, for example, an action in which one finger of user's hand is changed from a vertical posture to an inclined posture. Alternatively, it may be an action for as if lightly tapping an imaginary object with a fingertip or a tip of a pen. Note that the operation receiving unit 203 may receive an operation input through the IMU 26 and the space recognition sensor 24, such as air tapping, or may receive an operation in which a physical button provided in the augmented-reality display apparatus 20 is pressed down. Further, the operation receiving unit 203 may also receive an operation input through other arbitrary input devices.

In particular, in this example embodiment, the operation receiving unit 203 receives designation of a direction in the real-space coordinate system of which the starting point is the coordinates of the camera 25 in the real-space coordinate system. This process will be explained in detail. The user designates a direction in which a one predetermined point (e.g., one of the four corners of a swimming pool) is present in a real space. Note that, in this example embodiment, this one predetermined point is one point on a predetermined plane (which will be described later). The direction in which the one predetermined point is present in the real space is a direction from the augmented-reality display apparatus 20 (i.e., the camera 25) toward the above-described one point. In other words, the direction in which the one predetermined point is present in the real space is a direction in which the above-described one point exits as the augmented-reality display apparatus 20 (i.e., the camera 25) is defined as the starting point. For example, the user specifies the direction as follows. The user changes the orientation of the camera 25 so that the one predetermined point in the real space coincides with a predetermined point (e.g., the central point) in the field of view of the camera 25, and performs air tapping in the state in which these points coincide with each other. Note that a mark indicating the one predetermined point in the field of view of the camera 25 may be displayed on the display 27 in order to enable the user to make the one predetermined point in the real space coincide with the one predetermined point in the field of view of the camera 25. In this case, the user wearing the augmented-reality display apparatus 20, which is a head-mounted display device, adjusts the orientation of his/her head in order to make the mark coincide with the one predetermined point in the real space, and performs air tapping in the state in which both of them coincide with each other. The mark may indicate an area at or near the predetermined point in the field of view of the camera 25. In this case, the user wearing the augmented-reality display apparatus 20 adjusts the orientation of the augmented-reality display apparatus 20 by moving his/her head so that the one predetermined point in the real space is confined in the aforementioned area. The operation receiving unit 203 receives the orientation of the camera 25 at the time when the air tapping is detected as a direction in which the one predetermined point is present in the real space. Specifically, the operation receiving unit 203 receives the direction of the camera 25 in the real-space coordinate system, managed by the space management unit 201 at the time when the air tapping is detected as a direction designated by the user. As described above, in this example embodiment, the operation receiving unit 203 receives designation of the direction in the real-space coordinate system of which the starting point is the coordinates of the camera 25 in the real-space coordinate system. Note that the operation receiving unit 203 may also be referred to as a direction receiving unit.

When the operation receiving unit 203 receives the designation of the direction, the designation-information notification unit 204 notifies the information processing apparatus 10 of the coordinates of the camera 25 in the real-space coordinate system managed by the space management unit 201 and the designation of the direction received by the operation receiving unit 203. That is, the designation-information notification unit 204 notifies the information processing apparatus 10 of the position of the camera 25 in the real-space coordinate system and the direction in which the above-described one point is present in the real-space coordinate system as the camera 25 is defined as the starting point.

The user designates a direction while using the above-described one predetermined point in the real space as a reference position in the real space for specifying the position at which the AR image is displayed. Therefore, the designation-information notification unit 204 notifies the information processing apparatus 10 of information in the real-space coordinate system which indicates in which direction the reference position in the real space for specifying the position at which the AR image is displayed is present while using the augmented-reality display apparatus 20 as the starting point. Note that a plurality of reference positions may be used. For example, when the four corners of a swimming pool are used as reference positions, the number of reference positions is four. In this case, the user inputs directions in each of which a respective one of the four reference positions are present to the augmented-reality display apparatus 20 by repeating, four times, operations in each of which the direction for one of the four points is designated.

The display control unit 205 controls the displaying of the display 27. In particular, the display control unit 205 displays an AR image in an augmented-reality manner based on the coordinates in the real-space coordinate system for specifying the position at which the AR image is displayed, notified from the information processing apparatus 10. The coordinates in the real-space coordinate system for specifying the position at which the AR image is displayed are coordinates of the above-described reference position in the real-space coordinate system. Specifically, the display control unit 205 controls the position at which the AR image is displayed so that the user can see the AR image at a predetermined relative position relative to the reference position. Note that the position at which the AR image is displayed may be different from the reference position or may coincide with the reference position. That is, a vector indicating the relative position may be a non-zero vector or may be a zero vector.

For example, when there is only one reference position, the display control unit 205 performs control so that an AR image is displayed as if it is displayed, for example, at a position three meters above the reference position. Further, when there are two reference positions, the display control unit 205 performs control so that an AR image is displayed as if it is displayed at a predetermined relative position relative to a line segment defined by the two reference positions, for example, at a predetermined position parallel to this line segment. Further, when there are three or more reference positions, the display control unit 205 performs control so that an AR image is displayed as if it is displayed at a predetermined relative position relative to an area defined by these reference positions, for example, at a predetermined position within this area. For example, when the reference positions correspond to the four corners of a swimming pool, the four sets of coordinates notified from the information processing apparatus 10 correspond to the coordinates of the four corners of the swimming pool in the real-space coordinate system. Therefore, an area corresponding to the swimming pool is specified in the real-space coordinate system. Therefore, the display control unit 205 can control the displaying so that an AR image is displayed as if it is present, for example, above a starting box present on the short side of the swimming pool.

The AR image is transmitted from the information processing apparatus 10 to the augmented-reality display apparatus 20, but may be, for example, stored in advance in the memory 22 of the augmented-reality display apparatus 20. Further, the above-described predetermined relative position may be stored in advance in the memory 22 of the augmented-reality display apparatus 20, or the augmented-reality display apparatus 20 may be notified, by the information processing apparatus 10, of the predetermined relative position together with the notification of the coordinates of the reference position.

Figure 5:
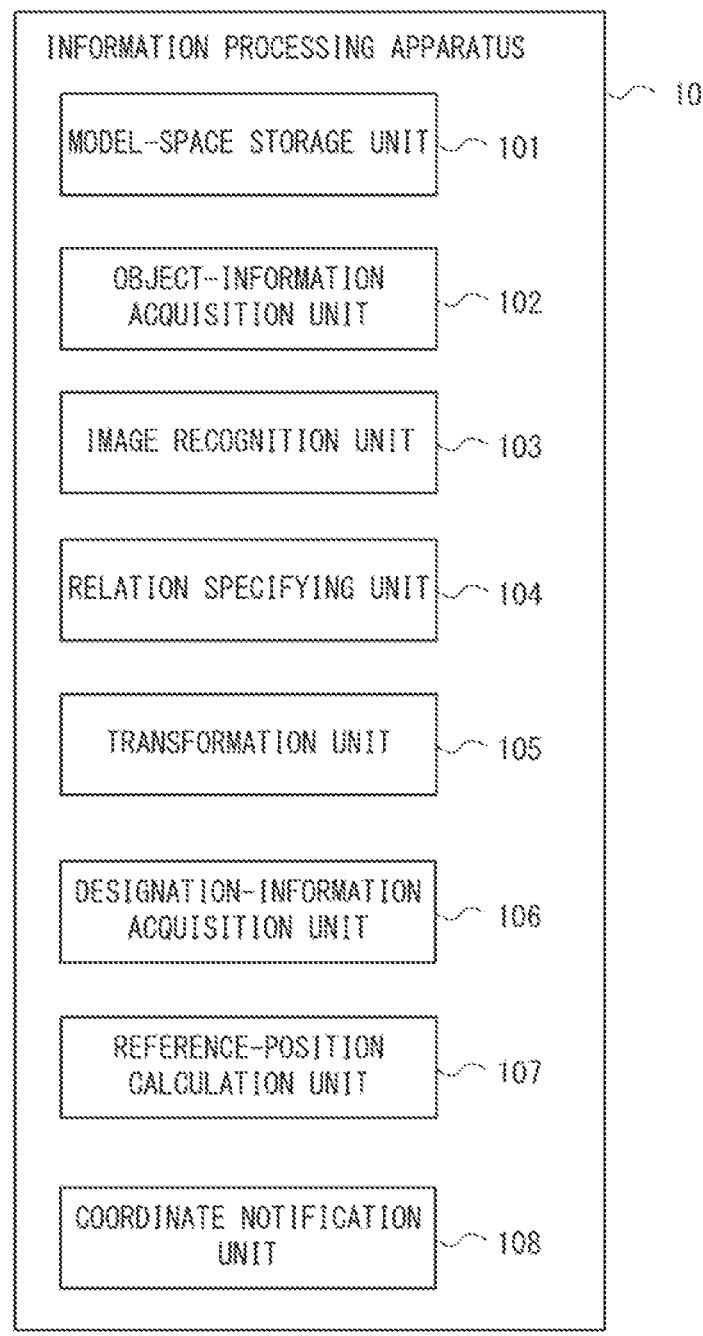
FIG. 5 is a block diagram showing an example of a functional configuration of the information processing apparatus according to the first example embodiment.

FIG. 5 is a block diagram showing an example of a functional configuration of the information processing apparatus 10. As shown in FIG. 5, the information processing apparatus 10 includes a model-space storage unit 101, an object-information acquisition unit 102, an image recognition unit 103, a relation specifying unit 104, a transformation unit 105, a designation-information acquisition unit 106, a reference-position calculation unit 107, and a coordinate notification unit 108. The processing of each of the object-information acquisition unit 102, the image recognition unit 103, the relation specifying unit 104, the transformation unit 105, the designation-information acquisition unit 106, the reference-position calculation unit 107, and the coordinate notification unit 108 is implemented by, for example, having the processor 13 execute a program. The model-space storage unit 101 is implemented by, for example, the memory 12 or other storage devices.

The model-space storage unit 101 stores a 3D (three-dimensional) model(s) of a predetermined object(s) present in a real space. The 3D model is disposed at predetermined coordinates in a model space having a coordinate system. Note that the coordinate system of the model space in which the 3D model is present is referred to as a model coordinate system. The predetermined object may be any object disposed in an environment in which AR displaying is performed. Which object in the environment should be used is determined by the user or the like. In the following description, this predetermined object will be referred to as a reference object. The model-space storage unit 101 has already stored a 3D model of the reference object together with coordinates indicating the position of the reference object in the model coordinate system.

Further, in this example embodiment, the model-space storage unit 101 further stores the below-described information in order to specify the coordinates of the reference position based on the information about the reference position notified from the augmented-reality display apparatus 20. That is, the model-space storage unit 101 further stores information defining a positional relation between a predetermined plane present in the real space and the reference object present in the real space. Specifically, for example, the model-space storage unit 101 stores a distance from the reference object present in the real space to the aforementioned plane, and a unit vector representing a direction of the plane as viewed from the reference object. This unit vector is a vector that is orthogonal to the plane and has a magnitude of one. Note that since the only requirement is that the positional relation between the plane and the reference object should be able to be specified, the model-space storage unit 101 may store the normal vector of the plane instead of storing the unit vector. Specifically, the plane is, for example, a floor surface, a ground surface, or the like. More specifically, the plane may be, for example, the upper surface of the water tank of a swimming pool, or the surface of the field of a soccer stadium, a rugby stadium, or an athletics stadium. However, the plane is not limited to the aforementioned examples.

Figure 6:
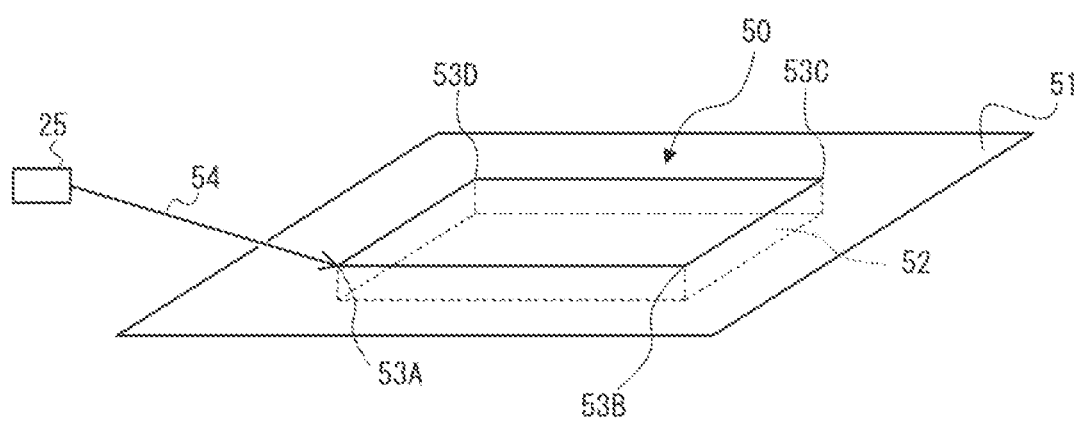
FIG. 6 is a perspective view showing an example of a reference position in a real space.

It is assumed that when a notification of information about a reference position is sent from the augmented-reality display apparatus 20, this reference position is present on the above-described predetermined plane. This feature will be explained by using a specific example. FIG. 6 is a perspective view showing an example of reference positions in a real space. In the example shown in FIG. 6, a swimming pool 50, a floor surface 51 which is used as the above-described predetermined plane, and a camera 25 are shown. A water tank 52 of the swimming pool 50 is located below the floor surface 51. When the four corners of the swimming pool 50 are used as reference positions, the four reference positions 53A, 53B, 53C and 53D are located on a plane that coincides with the floor surface 51. In FIG. 6, an arrow 54 is a vector indicating the direction of the reference position 53A as viewed from the camera 25, and corresponds to the direction received by the operation receiving unit 203. As shown in FIG. 6, the reference position 53A is an intersection between the vector represented by the arrow 54 and the floor surface 51.

The object-information acquisition unit 102 acquires an image of a reference object taken by the camera 25 of the augmented-reality display apparatus 20. That is, the object-information acquisition unit 102 acquires information transmitted by the image transmission unit 202 of the augmented-reality display apparatus 20. Therefore, the object-information acquisition unit 102 acquires the coordinates and the direction of the camera 25 in the real-space coordinate system together with the image of the reference object.

The image recognition unit 103 compares the image acquired by the object-information acquisition unit 102 with the 3D model of the reference object stored in the model-space storage unit 101 by performing image recognition processing. Then, the image recognition unit 103 specifies the position (the coordinates) and the direction of the camera 25 in the model coordinate system at the time when the camera 25 photographed the reference object. They can be specified by using information about the size and the orientation of the reference object photographed by the camera 25.

The relation specifying unit 104 specifies a correspondence relation between the model coordinate system and the real-space coordinate system based on the result of the comparison by the image recognition unit 103. Specifically, the relation specifying unit 104 compares the coordinates and the direction of the camera 25 in the real-space coordinate system, which have been acquired by the object-information acquisition unit 102 together with the image of the reference object, with the coordinates and the direction of the camera 25 in the model coordinate system specified by the image recognition unit 103. In this way, the relation specifying unit 104 specifies a coordinate transformation expression representing a transformation between both coordinate systems. Note that this coordinate transformation expression is expressed, for example, as an affine matrix.

The transformation unit 105 transforms coordinates and a direction between both coordinate systems by using the correspondence relation, i.e., the coordinate transformation expression, specified by the relation specifying unit 104. In particular, the transformation unit 105 transforms coordinates in the model coordinate system for specifying the position at which the AR image is displayed into coordinates in the real-space coordinate system.

When the coordinates in the model coordinate system for specifying the position at which the AR image is displayed are specified as a relative position from the reference object, the transformation unit 105 transforms the specified coordinates into coordinates in the real-space coordinate system. That is, when it is possible to specify the coordinates of the reference position in the model coordinate system as a relative position from the reference object in the model coordinate system, the transformation unit 105 transforms the coordinates specified as described above into coordinates in the real-space coordinate system. Note that specific examples of the relative position from the reference object include the position of the reference object itself. Therefore, the coordinates for specifying the position at which the AR image is displayed may be the coordinates of the reference object. That is, the reference position for the AR displaying may be the position of the reference object. In this case, since the reference position is determined in the model coordinate system in advance, it is unnecessary to send a notification about the reference position from the augmented-reality display apparatus 20. That is, the receiving of the designation of the direction by the operation receiving unit 203 and the notification to the information processing apparatus 10 by the designation-information notification unit 204 may be omitted.

When it is impossible to specify the reference position as a relative position from the position of the reference object, the transformation unit 105 transforms the coordinates of the reference position in the model coordinate system, specified based on the information acquired by the designation-information acquisition unit 106, into coordinates in the real-space coordinate system. In this case, the coordinates of the reference position in the model coordinate system are specified by processing performed by the designation-information acquisition unit 106, the transformation unit 105, and the reference-position calculation unit 107.

The designation-information acquisition unit 106 acquires the coordinates of the camera 25 in the real-space coordinate system and the designation of the direction in the real-space coordinate system of which the starting point is the coordinates of the camera 25. That is, the designation-information acquisition unit 106 acquires the contents of the notification by the designation-information notification unit 204 of the augmented-reality display apparatus 20. In other words, the designation-information acquisition unit 106 acquires information about the reference position from the augmented-reality display apparatus 20. In this case, the coordinates in the model coordinate system for specifying the position at which the AR image is displayed, i.e., the coordinates of the reference position in the model coordinate system, are specified based on the coordinates and the direction acquired by the designation-information acquisition unit 106.

When the designation-information acquisition unit 106 acquires the coordinates and the designation of the direction of the camera 25 in the real-space coordinate system, the transformation unit 105 transforms the coordinates and the direction into coordinates and a direction in the model coordinate system by using the coordinate transformation expression specified by the relation specifying unit 104. That is, when the designation-information acquisition unit 106 acquires information about the reference position, the transformation unit 105 transforms the coordinates and the direction indicated by this information.

The reference-position calculation unit 107 calculates coordinates of the reference position in the model coordinate system based on the result of the transformation of the coordinates and the direction acquired by the designation-information acquisition unit 106, performed by the transformation unit 105. In this example embodiment, the reference-position calculation unit 107 calculates, as the reference position, an intersection between the above-described predetermined plane and the vector represented by the coordinates and the direction transformed by the transformation unit 105.

Figure 7:
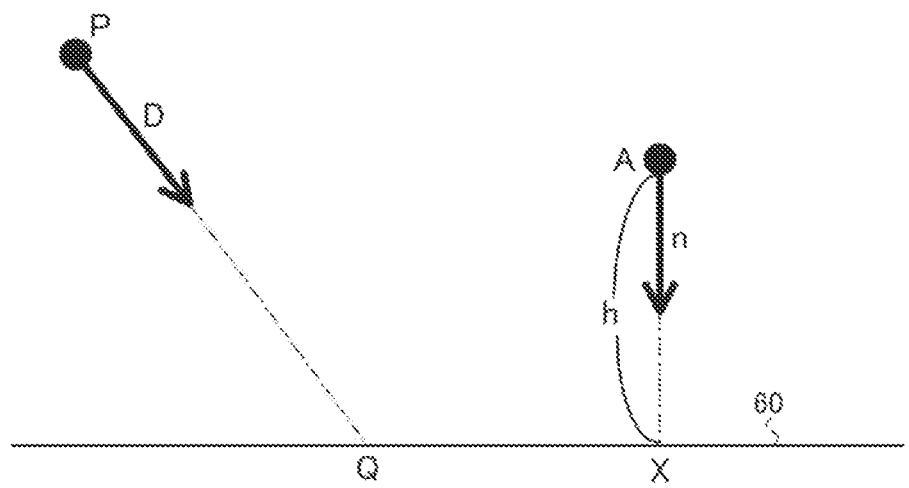
FIG. 7 is a schematic diagram for explaining calculation of coordinates of a reference position in a model coordinate system.

FIG. 7 is a schematic diagram for explaining calculation of coordinates of a reference position in a model coordinate system. In FIG. 7, a point P represents the position, i.e., coordinates, of the camera 25 in the model coordinate system. Further, a vector D indicates a direction in the model coordinate system for the direction acquired by the designation-information acquisition unit 106. The vector D is a vector of which the starting point is the point P. The point P and the vector D can be obtained by conversions by the transformation unit 105. The point A represents the position, i.e., coordinates, of the reference object in the model coordinate system. A distance h is a distance from the reference object (the point A) to a plane 60. A vector n is a unit vector representing the direction of the plane 60 as viewed from the reference object (the point A). The point A, the distance h, and the vector n are stored in advance in the model-space storage unit 101. Note that the intersection X between the reference object (the point A) and the plane 60 is expressed by the below-shown Expression (1).

$$X = A + hn \qquad (1)$$

Since the vector n can be considered to be the normal vector of the plane 60, the coordinates of the plane 60 in the model coordinate system are specified from the vector n and the point X. As described above, the reference-position calculation unit 107 first calculates the coordinates of the plane 60 in the model coordinate system. Therefore, the model-space storage unit 101 does not have to store the coordinates of the plane 60 in the model coordinate system in advance. Note that when the coordinates of the plane 60 in the model coordinate system are stored in the model-space storage unit 101 in advance, the above-described calculation is unnecessary.

Next, the reference-position calculation unit 107 calculates the coordinates of the intersection Q between the plane 60 and the vector D of which the starting point is the point P. The coordinates of this intersection Q correspond to the coordinates of the reference position in the model coordinate system. When there are a plurality of reference positions, the reference-position calculation unit 107 calculates coordinates of each of the reference positions in the model coordinate system.

When the reference-position calculation unit 107 calculates the coordinates of the reference position in the model coordinate system, the transformation unit 105 transforms the calculated coordinates into coordinates in the real-space coordinate system.

The coordinate notification unit 108 notifies the augmented-reality display apparatus 20 of the coordinates of the reference position transformed by the transformation unit 105, i.e., the coordinates of the reference position in the real-space coordinate system. Based on this notification, the display control unit 205 of the augmented-reality display apparatus 20 determines the position at which an AR image is displayed, and displays the AR image at the determined display position.

Figure 8:
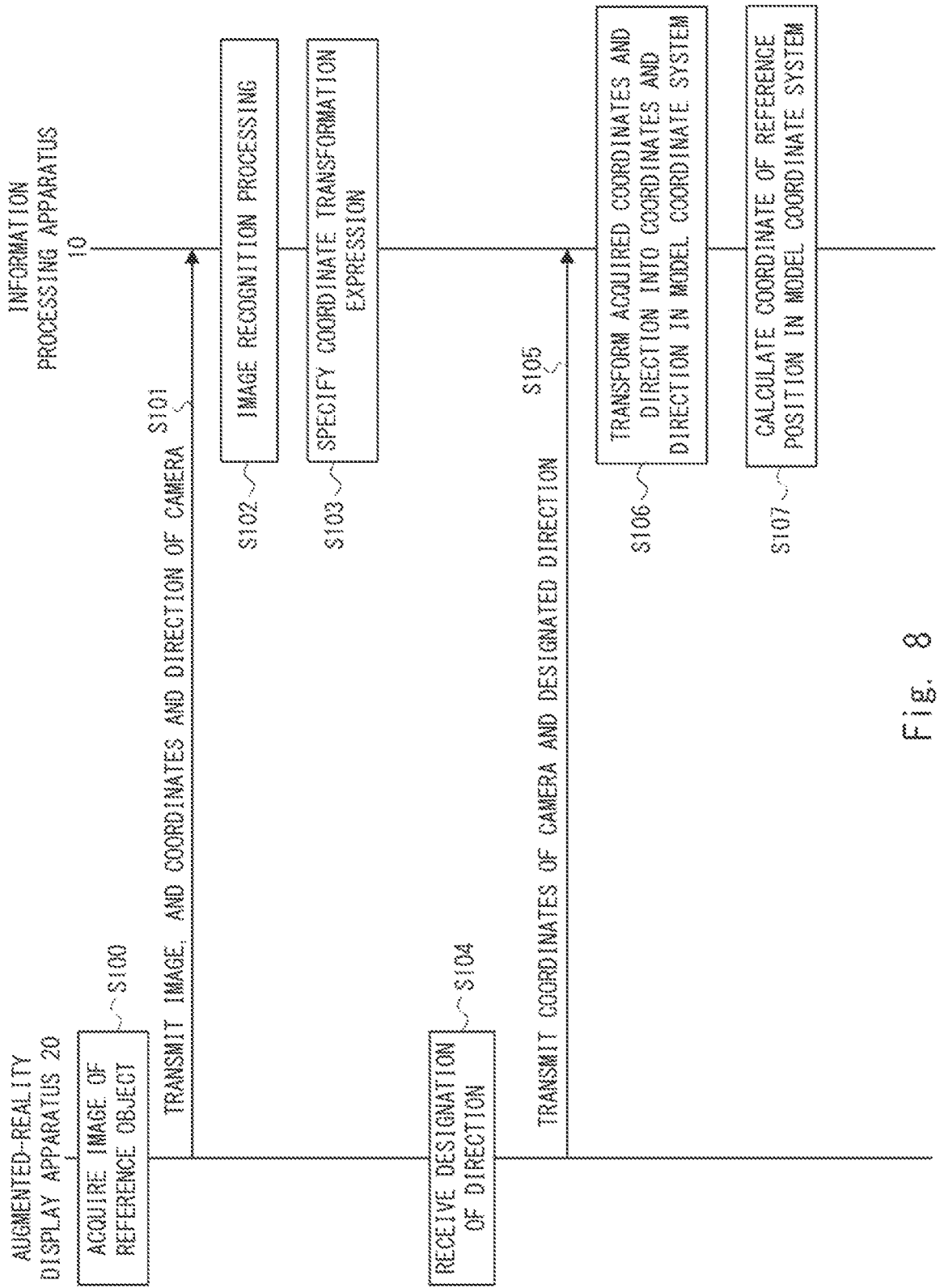
FIG. 8 is a sequence chart for explaining an example of operations for specifying coordinates of the reference position in the model coordinate system.

Next, operations performed by the display system 1 will be described. FIG. 8 is a sequence chart showing an example of operations for specifying coordinates of a reference position in a model coordinate system. The operations for specifying the coordinates of the reference position in the model coordinate system will be described hereinafter along the sequence chart shown in FIG. 8. Note that the operations shown in FIG. 8 may be performed between one augmented-reality display apparatus 20 and the information processing apparatus 10.

In a step S100, the camera 25 takes an image of a reference object.

Next, in a step S101, the image transmission unit 202 transmits, together with the image acquired in the step S100, the coordinates and the direction of the camera 25 at the time when the image was taken, which are managed by the space management unit 201, to the information processing apparatus 10. The object-information acquisition unit 102 of the information processing apparatus 10 acquires this transmitted information.

Next, in a step S102, the image recognition unit 103 compares the image of the reference object with the 3D model thereof by performing image recognition processing. Then, the image recognition unit 103 specifies the coordinates and the direction of the camera 25 at the time when the reference object was photographed in the model coordinate system.

Next, in a step S103, the relation specifying unit 104 specifies a coordinate transformation expression by using the coordinates and the direction of the camera 25 in the model coordinate system specified in the step S102 and the coordinates and the direction of the camera 25 in the real-space coordinate system acquired in the step S101.

Next, in a step S104, the operation receiving unit 203 receives designation of a direction in the real-space coordinate system of which the starting point is the coordinates of the camera 25 in the real-space coordinate system.

Next, in a step S105, the designation-information notification unit 204 transmits the coordinates of the camera 25 in the real-space coordinate system managed by the space management unit 201 and the direction designated in the step S104 to the information processing apparatus 10. The designation-information acquisition unit 106 of the information processing apparatus 10 acquires this transmitted information.

Next, in a step S106, the transformation unit 105 transforms the coordinates and the direction obtained in the step S105 into coordinates and a direction in the model coordinate system by using the coordinate transformation expression obtained in the step S103.

Next, in a step S107, the reference-position calculation unit 107 calculates the coordinates of the reference position in the model coordinate system based on the result of the transformation performed in the step S106. The reference-position calculation unit 107 stores the coordinates of the reference position in the model coordinate system, for example, in the memory 12.

Through the above-described operations, the coordinates of the reference position in the model coordinate system are specified. Note that when it is possible to specify the reference position as a relative position from the position of the reference object, only the processes up to the specification of the coordinate transformation expression (up to the step S103) are performed, and the processes in the steps S104 to S107 are omitted.

Figure 9:
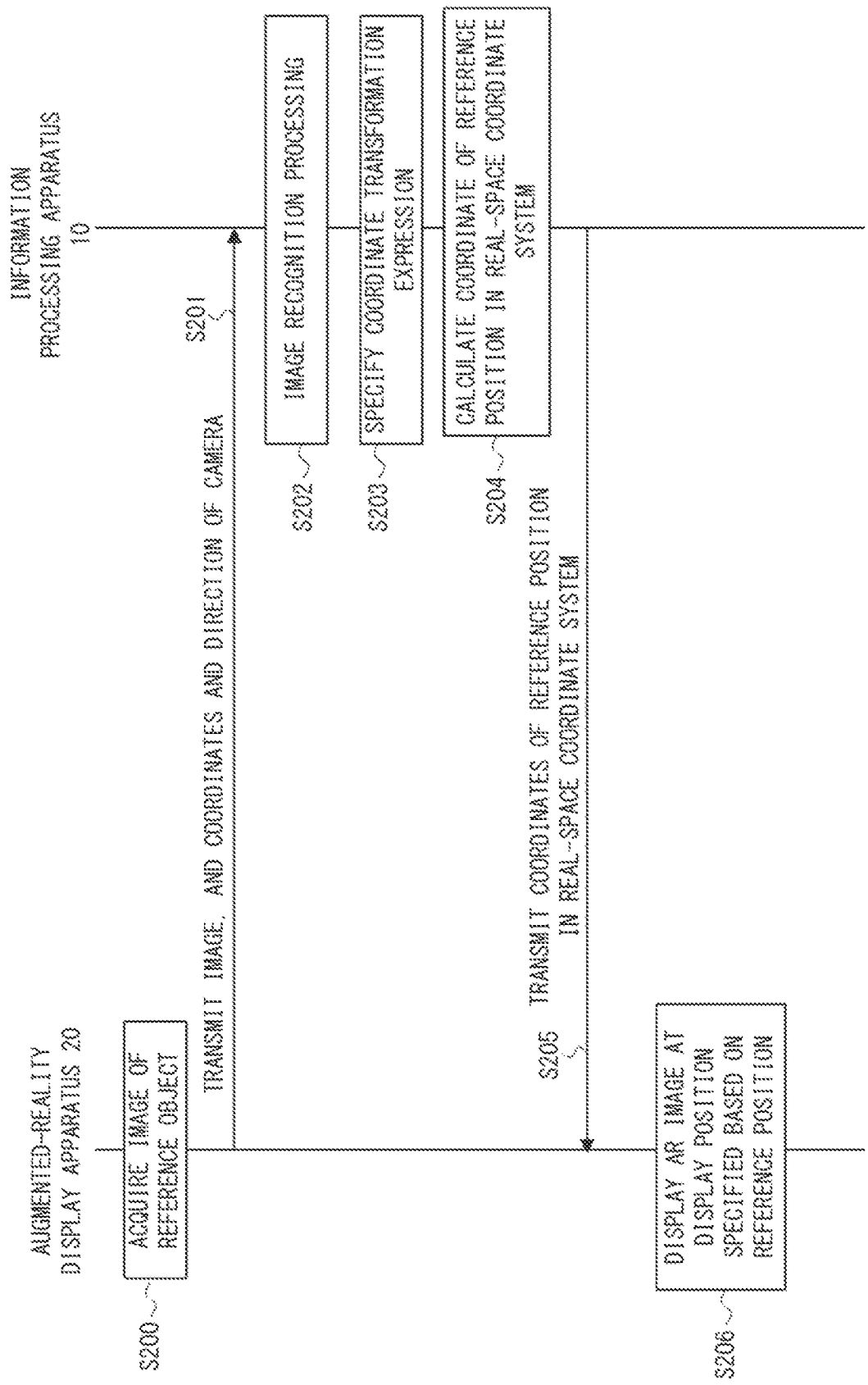
FIG. 9 is a sequence chart for explaining an example of operations for displaying an AR image.

FIG. 9 is a sequence chart showing an example of operations for displaying an AR image. The operations for displaying the AR image will be described hereinafter along the sequence chart shown in FIG. 9.

The information processing apparatus 10 has already specified the coordinates of the reference position in the model coordinate system through the operations shown in FIG. 8. Therefore, if it is possible to notify the augmented-reality display apparatus 20 of the coordinates of the reference position in the real-space coordinate system, the augmented-reality display apparatus 20 can appropriately display an AR image at a position that is determined in accordance with the reference position. Therefore, processes described below are performed. When the AR image is displayed in the augmented-reality display apparatus 20 used for the operations shown in FIG. 8, the coordinate transformation expression for this augmented-reality display apparatus 20 has already been specified through the operations shown in FIG. 8. Therefore, the processes from steps S200 to S203 may be omitted. However, for an augmented-reality display apparatus 20 that was not used for the operations shown in FIG. 8, it is necessary to specify the coordinate transformation expression. Therefore, the steps S200 to S203, which are similar to the steps S100 to S103 in FIG. 8, are performed. That is, the information processing apparatus 10 specifies a coordinate transformation expression for each of a plurality of augmented-reality display apparatuses 20.

In the step S200, the camera 25 acquires an image of the reference object.

Next, in the step S201, the image transmission unit 202 transmits, together with the image acquired in the step S200, the coordinates and the direction of the camera 25 at the time when the image was taken, which are managed by the space management unit 201, to the information processing apparatus 10. The object-information acquisition unit 102 of the information processing apparatus 10 acquires this transmitted information.

Next, in the step S202, the image recognition unit 103 compares the image of the reference object with the 3D model thereof by performing image recognition processing. Then, the image recognition unit 103 specifies the coordinates and the direction of the camera 25 at the time when the reference object was photographed in the model coordinate system.

Next, in the step S203, the relation specifying unit 104 specifies a coordinate transformation expression by using the coordinates and the direction of the camera 25 in the model coordinate system specified in the step S202 and the coordinates and the direction of the camera 25 in the real-space coordinate system acquired in the step S201.

Next, in a step S204, the transformation unit 105 calculates the coordinates of the reference position in the real-space coordinate system by using the coordinate transformation expression. Note that the transformation unit 105 may transform the coordinates calculated in the step S107, or may transform the coordinates specified as the relative position from the position of the reference object. In particular, when the AR image is displayed as if it is displayed at the position of the reference object, the transformation unit 105 may calculate the coordinates of the reference object in the real-space coordinate system by using the coordinate transformation expression.

Next, in a step S205, the coordinate notification unit 108 transmits the coordinates calculated in the step S204 to the augmented-reality display apparatus 20.

Next, in a step S206, the display control unit 205 displays the AR image at the display position specified based on the coordinates acquired in the step S205. That is, the display control unit 205 displays the AR image based on the coordinates in the real-space coordinate system for specifying the position at which the AR image is displayed, notified from the information processing apparatus 10. Note that when the display control unit 205 receives the coordinates of the reference object from the information processing apparatus 10, the display control unit 205 may display the AR image as if it is displayed at the position of the reference object.

Note that it is conceivable that an error occurs in the coordinate system managed by the space management unit 201 due to the movement or the like of the augmented-reality display apparatus 20. Therefore, when a new image of the reference object is acquired by the object-information acquisition unit 102, the relation specifying unit 104 may specify the correspondence relation (the coordinate transformation expression) again. By doing so, it is possible to prevent an error from occurring in the position at which the AR image is displayed.

Further, the processes in the steps S104 to S107 shown in FIG. 8 may be performed for each of a plurality of reference positions. That is, the designation-information acquisition unit 106 may acquire a plurality of sets each of which is composed of coordinates of the camera 25 in the real-space coordinate system and designation of a direction in the real-space coordinate system of which the starting point is the coordinates of the camera 25. When doing so, the display control unit 205 may specify the position at which the AR image is displayed by using a line segment or an area represented by a plurality of reference positions (coordinates of a plurality of points) transformed by the transformation unit 105 in the step S204. By doing so, it is possible to display an AR image at various positions. For example, it is possible to perform control so that an AR image is displayed as if it is displayed at a predetermined position parallel to the line segment. For example, it is possible to perform control so that an AR image is displayed as if it is displayed at a predetermined position within the area.

The first example embodiment has been described above. According to this example embodiment, the augmented-reality display apparatus 20 can obtain coordinates in a real-space coordinate system as a position for specifying the position at which an AR image is displayed. Therefore, even when the position at which an AR image is displayed in the real space cannot be appropriately detected by the space recognition sensor 24, the augmented-reality display apparatus 20 can specify the position at which the AR image is displayed in the real-space coordinate system managed by the augmented-reality display apparatus 20. Therefore, it is possible to appropriately display AR even at a place where it is difficult to acquire feature points by using the space recognition sensor 24, for example, at a large place such as a sport venue, or even at a distant place. As described above, according to this example embodiment, it is possible to appropriately display an AR image at a desired position in marker-less type AR displaying. Further, the display position is specified in the real-space coordinate system. Therefore, it is possible to display an AR image at an appropriate display position even when the position and the orientation of the augmented-reality display apparatus 20 are such a position and an orientation that the space recognition sensor 24 or the camera 25 cannot detect the reference object and the position at which the AR image is displayed. Further, in this example embodiment, the image recognition processing is performed by the information processing apparatus 10. Therefore, it is possible to reduce the processing load on the augmented-reality display apparatus 20 side.

SECOND EXAMPLE EMBODIMENT

In the first example embodiment, a method for calculating coordinates of a reference position by calculating coordinates of the intersection Q between the plane 60 and the vector D of which the starting point is the point P has been described. In this example embodiment, another method for calculating coordinates of a reference position will be described. Note that, in the following description, differences from the first example embodiment will be mainly described, and redundant descriptions will be omitted as appropriate.

In this example embodiment, the model-space storage unit 101 has already stored, in addition to the 3D model of the reference object and the coordinates indicating the position of the reference object in the model coordinate system, information about a shape(s) of a venue(s) where AR displaying is performed (also referred to as a display venue). Note that although an example case in which the display venue is a sport venue is explained in the following description, the display venue is not limited to the sport venue.

The information about a shape of a sport venue is information including information about a distance between two predetermined points in the sport venue, information indicating a positional relation between a line segment determined by these two points and one predetermined point in the sport venue different from these two points, and information specifying which positions in the sport venue these three predetermined points correspond to. These three predetermined points are points located on a plane in the sport venue, and all of them are used as reference positions. Note that the information indicating the positional relation between the line segment determined by the two predetermined points and the one predetermined point is information for specifying the position of the one predetermined point from the line segment.

For example, when the sport venue is rectangular, the above-described two predetermined points are both ends of one of the line segments constituting the rectangle. Further, the above-described one predetermined point is an end of another one of the line segments constituting the rectangle that is orthogonal to the aforementioned line segment (note that the one point is different from the aforementioned two predetermined points). In this case, in the shape information of the sport venue, the distance between the two predetermined points in the sport venue is information indicating a distance between both ends of one side of the rectangle. Further, in the shape information of the sport venue, the information indicating the positional relation between the line segment determined by the two points and the one predetermined point is information indicating that the one predetermined point is located as one of both ends of another side of the rectangle that is parallel to the aforementioned one side of the rectangle and a predetermined distance away from the one side. The information specifying which positions in the sport venue these three predetermined points corresponds to is information indicating a condition that these three predetermined points correspond to three vertices of the rectangular sport venue. Therefore, if it is possible to specify the coordinates of the two predetermined points, it is possible to uniquely specify the sport venue by referring to the shape information of the sport venue. "Specifying the sport venue" includes specifying the coordinates of three predetermined points on a plane in the sport venue. In this example embodiment, "specifying the sport venue" is also expressed as "specifying an area where the sport venue is present. Note that although the three predetermined points are points corresponding to two orthogonal sides of the rectangular sport venue in the above-described example, the shape of the sport venue is not limited to the rectangle. For example, the three predetermined points may be three points corresponding to ends of two predetermined orthogonal line segments in the sport venue. Further, the three predetermined points may not be three points corresponding to ends of two predetermined orthogonal line segments. For example, in the case of a baseball ground, a home base (one point) and intersections between right and left foul lines and fence (two points), i.e., three points in total, may be used. When there is no fence, intersections between foul lines and line separating the inside of the ground from the outside thereof may be used instead of using the intersections between the foul lines and the fence.

Further, the model-space storage unit 101 stores a unit vector representing the direction of the plane in the sport venue as viewed from the reference object present in the real space. This unit vector is a vector that is orthogonal to the plane in the sport venue and has a magnitude of one. Note that the model-space storage unit 101 may store the normal vector of the plane in the sport venue instead of storing the unit vector. Specifically, the plane in the sport venue is, for example, a floor surface or a ground surface. More specifically, the plane in the sport venue may be, for example, the upper surface of the water tank of a swimming pool, or the surface of the field of a soccer stadium, a rugby stadium, a baseball stadium, or an athletics stadium. However, the plane in the sport venue is not limited to the aforementioned examples.

In this example embodiment, the model-space storage unit 101 does not necessarily have to store the distance from the reference object present in the real space to the plane in the sport venue, but may store this distance. In this case, the information about this distance may be referred to when the sport venue is specified. However, in this example embodiment, it is possible to specify the coordinates of the reference position without using this distance information (which will be described later).

The reference-position calculation unit 107 according to this example embodiment calculates the coordinates of the reference position based on the above-described information about the two predetermined points acquired by the designation-information acquisition unit 106. In this example embodiment, the reference-position calculation unit 107 calculates the coordinates of the reference position by using the information about the two predetermined points acquired by the designation-information acquisition unit 106 and the shape information of the sport venue stored in the model-space storage unit 101.

Figure 10:
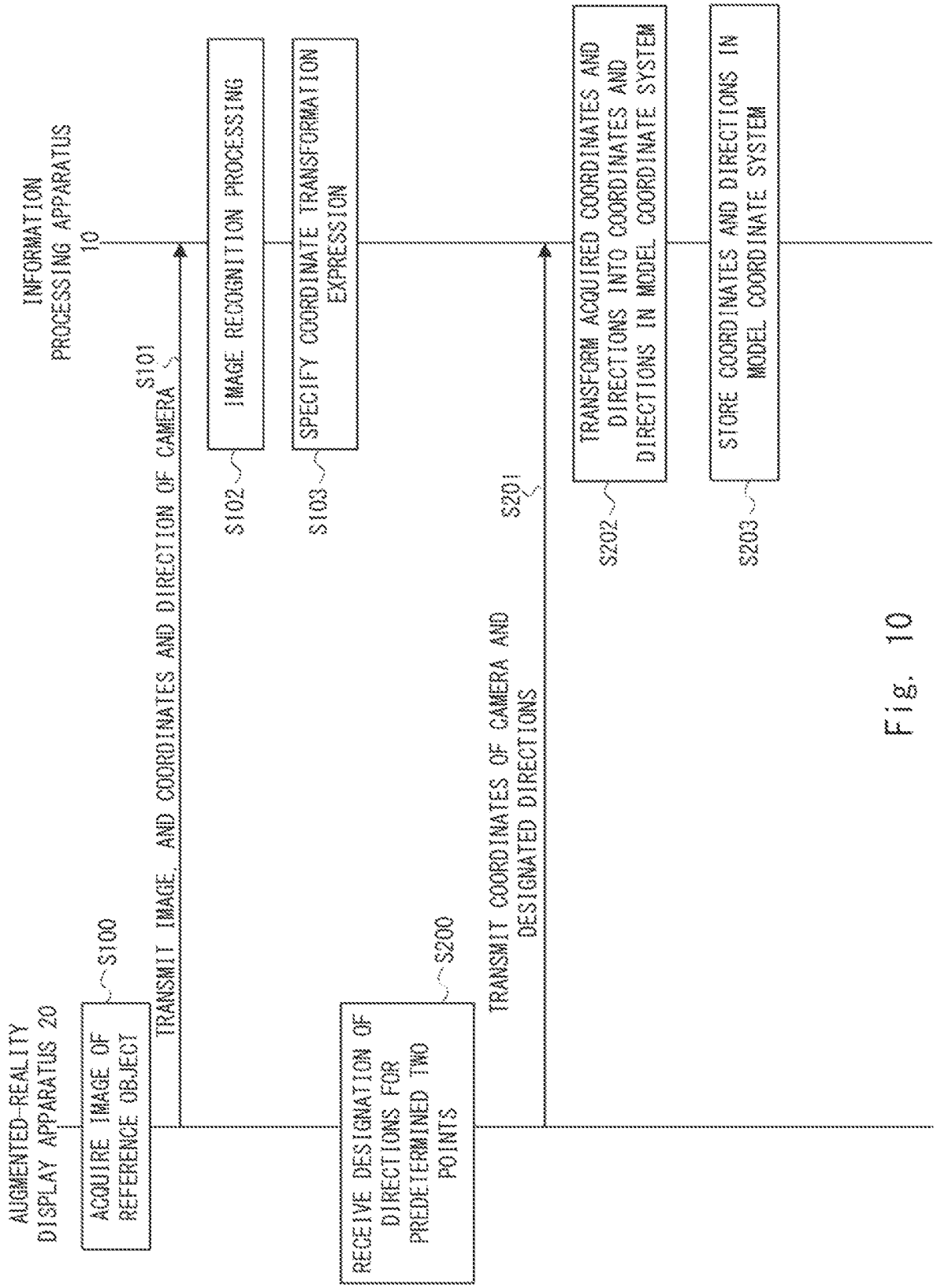
FIG. 10 is a sequence chart for explaining an example of operations for storing information about two predetermined points.

Operations performed by the display system 1 according to this example embodiment will be described. In this example embodiment, in order to specify the coordinates of a reference position, firstly, a process for storing information about the above-described two predetermined points (i.e., two predetermined reference positions) is performed. FIG. 10 is a sequence chart showing an example of operations for storing information about two predetermined points. The operations for storing information about two predetermined points will be described hereinafter along the sequence chart shown in FIG. 10. Note that the operations shown in FIG. 10 may be performed between one augmented-reality display apparatus 20 and the information processing apparatus 10.

In the sequence chart shown in FIG. 10, similarly to the sequence chart shown in FIG. 8, firstly, processes in steps S100 to S103 are performed, so that a coordinate transformation expression is specified.

Next, in a step S200, the operation receiving unit 203 receives, for each of the two predetermined points (the two predetermined reference positions), designation of a direction in the real-space coordinate system of which the starting point is the coordinates of the camera 25 in the real-space coordinate system. That is, the operation receiving unit 203 receives designation of a direction of a predetermined first point on a plane in the sport venue in the real space and designation of a direction of a predetermined second point on the plane in the sport venue.

A user designates, for example, directions for two points (i.e., two vertices) adjacent to each other among the vertices of a square sport venue. For example, referring to the example shown in FIG. 6, the user specifies directions for two points adjacent to each other (e.g., both ends of one side of the sport venue) among the four corners 53A, 53B, 53C and 53D of the sport venue (more specifically, the water tank of the swimming pool). For example, the user specifies the directions of the reference positions 53A and 53B.

Next, in a step S201, the designation-information notification unit 204 transmits, to the information processing apparatus 10, the coordinates of the camera 25 in the real-space coordinate system at the time when the directions were designated, managed by the space management unit 201, and the two directions designated in the step S200. The designation-information acquisition unit 106 of the information processing apparatus 10 acquires this transmitted information.

Next, in a step S202, the transformation unit 105 transforms the coordinates and the direction in the real-space coordinate system acquired in the step S201 into coordinates and a direction in the model coordinate system by using the coordinate transformation expression acquired in the step S103.

Next, in a step S203, the transformation unit 105 stores the coordinates and the direction in the model coordinate system obtained in the step S202 in the model-space storage unit 101. That is, information about a vector in the model coordinate system is stored for each of the two predetermined points (the two reference positions).

Figure 11:
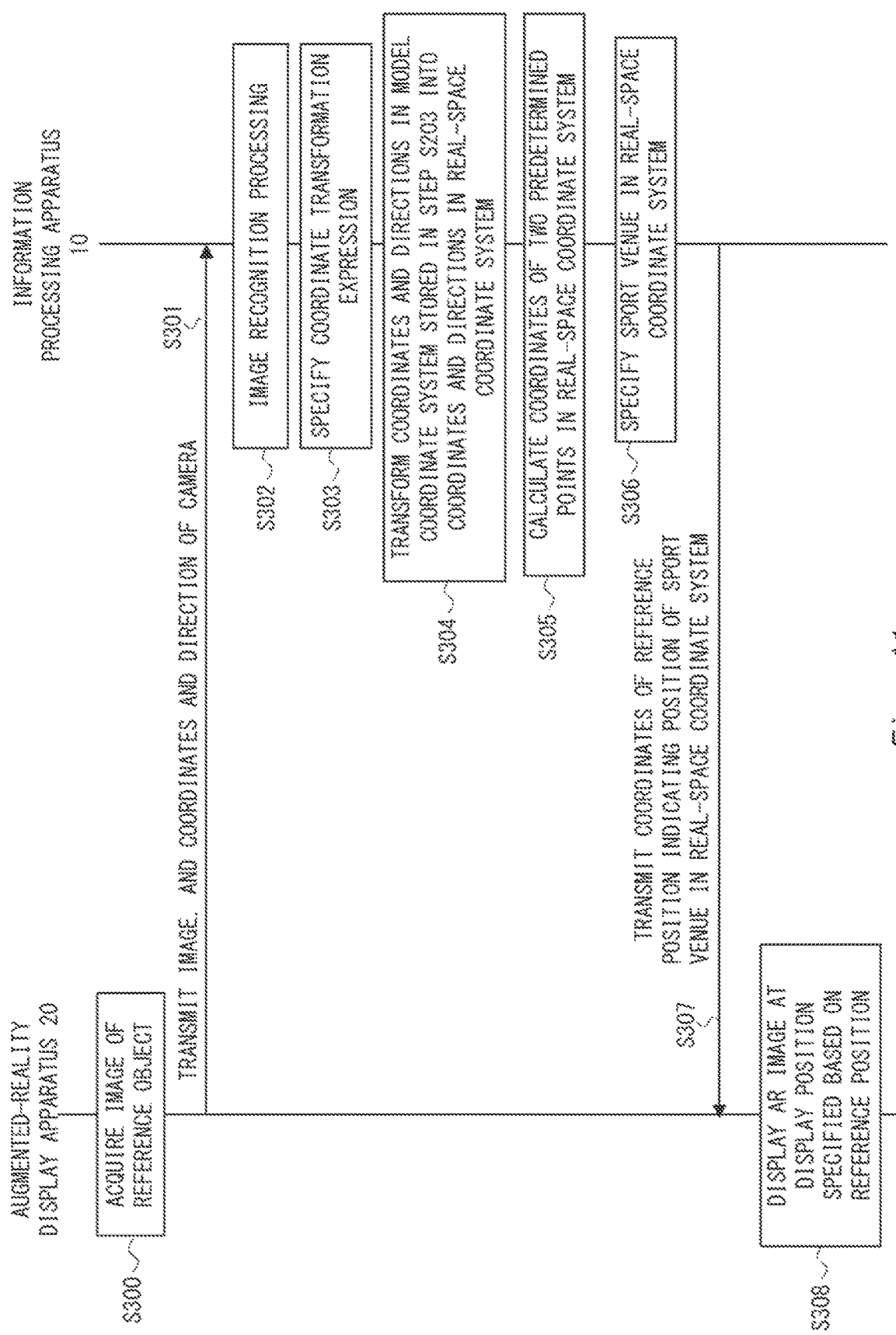
FIG. 11 is a sequence chart showing an example of operations for specifying a sport venue by using the two predetermined points, and displaying an AR image.

FIG. 11 is a sequence chart showing an example of operations for specifying a sport venue by using two predetermined points (two reference positions), and displaying an AR image. The operations for displaying an AR image in this example embodiment will be described hereinafter along the sequence chart shown in FIG. 11.

Through the operations shown in FIG. 10, information about a vector for each of the two predetermined points (the two reference positions) in the model coordinate system is stored in the information processing apparatus 10. Then, if it is possible to specify the coordinates of the reference position in the real-space coordinate system by using the aforementioned vector information, the augmented-reality display apparatus 20 can appropriately display an AR image at a position that is determined in accordance with the reference position. Therefore, processes described below are performed. Note that when the AR image is displayed in the augmented-reality display apparatus 20 used for the operations shown in FIG. 10, the coordinate transformation expression for this augmented-reality display apparatus 20 has already been specified through the operations shown in FIG. 10. Therefore, the processes from steps S300 to S303 may be omitted. However, for an augmented-reality display apparatus 20 that was not used for the operations shown in FIG. 10, it is necessary to specify the coordinate transformation expression. Therefore, the steps S300 to S303, which are similar to the steps S100 to S103, in FIG. 10, are performed. That is, the information processing apparatus 10 specifies a coordinate transformation expression for each of a plurality of augmented-reality display apparatuses 20. Processes in the steps S300 to S303 are similar to those in the steps S100 to S103, and therefore descriptions thereof are omitted. Therefore, a step S304 and the subsequent steps are described hereinafter.

In the step S304, the transformation unit 105 transforms the coordinates and the direction in the model coordinate system stored in the step S203 in FIG. 10 into coordinates and a direction in the real-space coordinate system by using a respective one of the specified coordinate transformation expressions. That is, the transformation unit 105 transforms the coordinates of the position of the camera 25 in the model coordinate system, which were used in the operations shown in FIG. 10 at the time when the direction thereof was designated, and the directions of the two reference positions in the model coordinate system into those in the real-space coordinate system by using the specified coordinate transformation expression. In this way, it is possible to obtain vector information for each of the two predetermined points (the two reference positions) in the real-space coordinate system even in an augmented-reality display apparatus 20 which was not used in the operations shown in FIG. 10 (for which the directions of the two reference positions were not designated).

In a step S305, the reference-position calculation unit 107 calculates the coordinates of the two predetermined points, i.e., the two reference positions in the real-space coordinate system. The reference-position calculation unit 107 calculates the coordinates of the two reference positions by using the vector information in the real-space coordinate system obtained in the step S304, the shape information of the sport venue, and the unit vector orthogonal to the plane in the sport venue stored in the model-space storage unit 101.

Note that, in this step, the reference-position calculation unit 107 uses, in particular, the information about the distance between the two predetermined points included in the shape information of the sport venue. The reference-position calculation unit 107 specifies the coordinates of the two reference positions 55A and 55B on the plane in the sport venue in the real-space coordinate system by using the vector information in the real-space coordinate system obtained in the step S304, i.e., the coordinates P and the vectors $D_1$ and $D_2$ representing the directions, the distance W between the two predetermined points stored in the model-space storage unit 101, and the unit vector n orthogonal to the plane in the sport venue (see FIG. 12). That is, the coordinates of the two reference positions on the plane in the sport venue are uniquely specified in the real-space coordinate system. More specifically, the reference-position calculation unit 107 calculates the coordinates of the two reference positions 55A and 55B on the plane in the sport venue in the real-space coordinate system based on the condition that the magnitude of the vector represented by the vectors $D_1$ and $D_2$ obtained in the step S304 is W and the vector represented by the vectors $D_1$ and $D_2$ is orthogonal to the unit vector n. In this way, the coordinates of two predetermined points among the above-described three predetermined points related to the shape information of the sport venue in the real-space coordinate system are calculated.

Next, in a step S306, the reference-position calculation unit 107 specifies the sport venue in the real-space coordinate system. Specifically, the reference-position calculation unit 107 specifies the sport venue in the real-space coordinate system based on, among pieces of information included in the shape information of the sport venue, the information indicating the positional relation between the line segment determined by the two predetermined points and the one predetermined point, and the information specifying which positions in the sport venue these three predetermined points correspond to. For example, the sport venue is specified in the real-space coordinate system as described below. Here, as an example, it is assumed that the information specifying which positions in the sport venue the three predetermined points correspond to indicates that the three predetermined points correspond to three vertices of the rectangular sport venue. Further, it is assumed that the information indicating the positional relation between the line segment determined by the two points and the one predetermined point is information indicating that the one predetermined point is one of both ends of another side of the rectangle that is parallel to the line segment and a predetermined distance away from the line segment. In this case, the coordinates of two vertices of the rectangle adjacent to each other are calculated in the step S305, and the coordinates of the remaining two vertices are calculated in the step S306. In this way, the reference-position calculation unit 107 can specify an area in which the sport venue is present in the real-space coordinate system. Note that the reference-position calculation unit 107 is also referred to as a display-venue specifying unit.

Figure 12:
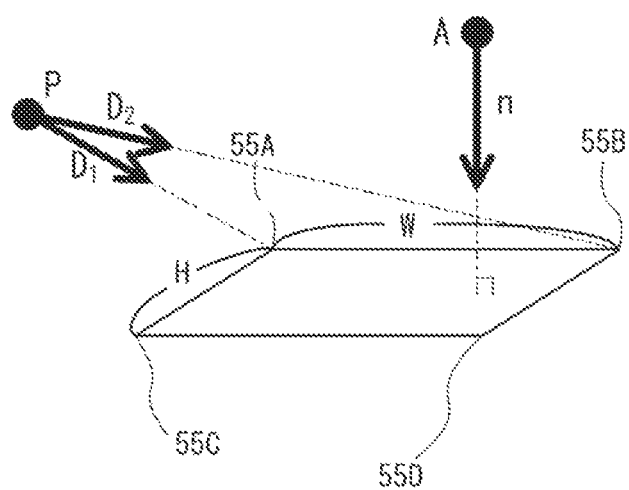
FIG. 12 is a schematic diagram for explaining calculation of four vertices of a rectangular sport venue.

FIG. 12 is a schematic diagram for explaining calculation of the four vertices of a rectangular sport venue. In FIG. 12, reference positions 55A, 55B, 55C and 55D represent the four vertices of the rectangular sport venue. Among these reference positions, the reference positions 55A and 55B are examples of the above-described two predetermined points. A point A represents the position, i.e., coordinates, of the reference object in the real-space coordinate system. A vector n is a unit vector representing the direction of the plane in the sport venue as viewed from the reference object (the point A). A point P represents the position, i.e., coordinates, of the camera 25, which was used in the operations shown in FIG. 10, in the real-space coordinate system. Further, vectors $D_1$ and $D_2$ represent the directions for the two predetermined points in the real-space coordinate system. Each of the vectors $D_1$ and $D_2$ is a vector of which the starting point is the point P. The model-space storage unit 101 has already stored a distance W between the two predetermined points (the reference positions 55A and 55B) as shape information of the sport venue. Further, the model-space storage unit 101 has already stored, as the shape information of the sport venue, information indicating that the reference position 55C (corresponding to the above-described one predetermined point) is an end of another side (the line segment between 55C and 55D) of the rectangle that is parallel to the line segment determined by the reference positions 55A and 55B and a predetermined distance H away from the line segment. Further, the model-space storage unit 101 has already stored, as the shape information of the sport venue, information indicating that the sport venue is rectangular (corresponding to the information specifying which positions in the sport venue the three predetermined points correspond to).

As described above, the reference-position calculation unit 107 specifies the coordinates of the reference positions 55A and 55B on the plane in the sport venue by the vectors $D_1$ and $D_2$, the distance W, and the vector n. Note that when the distance from the reference object to the plane in the sport venue is already stored, more accurate coordinates on the plane in the sport venue may be specified by referring to the distance information. The reference-position calculation unit 107 calculates the coordinates of the two reference positions 55A and 55B on the plane in the sport venue in the real-space coordinate system based on the condition that the magnitude of the vector representing the difference between the vectors $D_1$ and $D_2$ is W and the vector representing this difference is orthogonal to the vector n. Then, the reference-position calculation unit 107 calculates the coordinates of the reference positions 55C and 55D which are away from the reference positions 55A and 55B, respectively by the distance H.

After the step S306, in a step S307, the coordinate notification unit 108 of the information processing apparatus 10 transmits the coordinates representing the position of the sport venue in the real-space coordinate system to the augmented-reality display apparatus 20. For example, the coordinate notification unit 108 transmits the coordinates of the four reference positions (the four vertices) of the rectangular sport venue in the real-space coordinate system to the augmented-reality display apparatus 20.

Next, in a step S308, the display control unit 205 displays an AR image at the display position specified based on the coordinates acquired in the step S307. That is, the display control unit 205 displays the AR image based on the coordinates in the real-space coordinate system for specifying the position at which the AR image is displayed, notified from the information processing apparatus 10.

The second example embodiment has been described above. According to this example embodiment, it is possible to specify a sport venue even when the distance from the reference object present in the real space to the plane in the sport venue is unknown. Note that the information processing apparatus 10 may implement both the method described in the first example embodiment and the method described in this example embodiment as a method for calculating coordinates for specifying the position at which an AR image is displayed.

THIRD EXAMPLE EMBODIMENT

Figure 13:
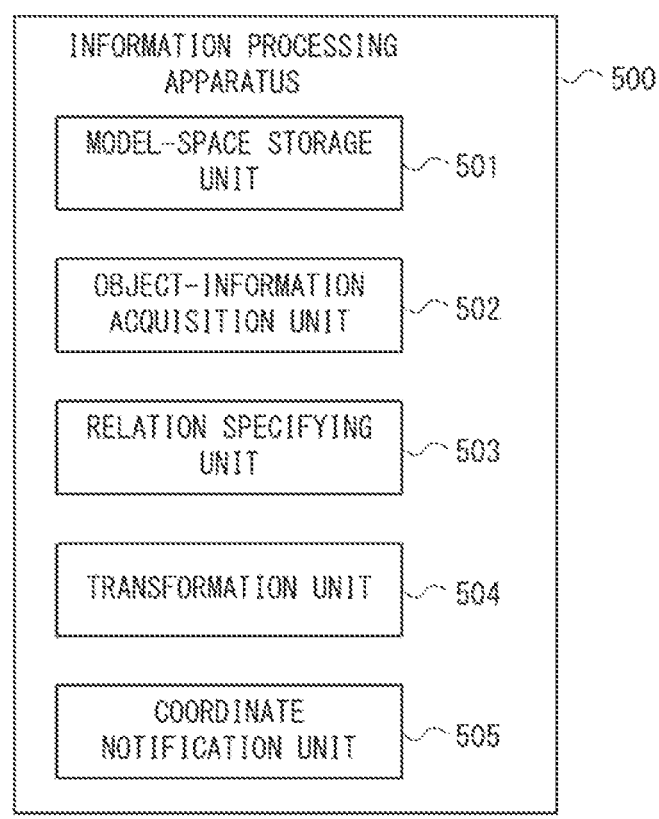
FIG. 13 is a block diagram showing an example of a functional configuration of an information processing apparatus according to a third example embodiment.

Although the display system 1 has been described in each of the above example embodiments, an AR image can be appropriately displayed at a desired position in marker-less type AR displaying even in an example embodiment shown in FIG. 13.

FIG. 13 is a block diagram showing an example of a functional configuration of an information processing apparatus 500 according to a third example embodiment. The information processing apparatus 500 includes a model-space storage unit 501, an object-information acquisition unit 502, a relation specifying unit 503, a transformation unit 504, and a coordinate notification unit 505.

The model-space storage unit 501 stores a 3D model(s) of a reference object(s) present in a real space.

The object-information acquisition unit 502 acquires an image of the reference object taken by a camera of an augmented-reality display apparatus.

The relation specifying unit 503 specifies a correspondence relation between a model coordinate system and a real-space coordinate system based on the result of a comparison between the acquired image and the 3D model of the reference object.

The transformation unit 504 transforms coordinates in the model coordinate system for specifying the position at which an AR image is displayed into coordinates in the real-space coordinate system by using the correspondence relation specified by the relation specifying unit 503.

The coordinate notification unit 505 notifies the augmented-reality display apparatus of the coordinates transformed by the transformation unit 504.

According to the above-described information processing apparatus 500, it is possible to notify the augmented-reality display apparatus of the coordinates of the reference position in the real-space coordinate system for specifying the position at which the AR image is displayed. Therefore, the augmented-reality display apparatus can specify the position at which the AR image is displayed according to the coordinates. Therefore, it is possible to appropriately display an AR image at a desired position in marker-less type AR displaying.

Note that the present invention is not limited to the above-described example embodiments, and they may be modified as appropriate without departing from the spirit and scope of the invention.

The whole or part of the example embodiments disclosed above can be described as, but not limited to, the following supplementary notes.

(Supplementary Note 1)

An information processing apparatus comprising:
  model-space storage means for storing a 3D (three-dimensional) model of a predetermined object present in a real space;
  object-information acquisition means for acquiring an image of the object taken by a camera of an augmented-reality display apparatus;
  relation specifying means for specifying a correspondence relation between a model coordinate system and a real-space coordinate system based on a result of a comparison between the image and the 3D model, the model coordinate system being a coordinate system in a model space in which the 3D model is present, and the real-space coordinate system being a coordinate system in a real space managed by the augmented-reality display apparatus;
  transformation means for transforming coordinates in the model coordinate system for specifying a position at which a predetermined image is displayed into coordinates in the real-space coordinate system by using the correspondence relation specified by the relation specifying means; and
  coordinate notification means for notifying the augmented-reality display apparatus of the coordinates transformed by the transformation means.

(Supplementary Note 2)

The information processing apparatus described in Supplementary note 1, wherein the coordinates in the model coordinate system for specifying the position at which the predetermined image is displayed are specified as a position relative to the object.

(Supplementary Note 3)

The information processing apparatus described in Supplementary note 1, further comprising designation-information acquisition means for acquiring coordinates of the camera in the real-space coordinate system and designation of a direction in the real-space coordinate system of which a starting point is the coordinates of the camera, wherein
  the coordinates in the model coordinate system for specifying the position at which the predetermined image is displayed are coordinates specified based on the coordinates and the direction acquired by the designation-information acquisition means.

(Supplementary Note 4)

The information processing apparatus described in Supplementary note 3, wherein
  the designation-information acquisition means acquires a plurality of sets each of which is composed of coordinates of the camera in the real-space coordinate system and a direction in the real-space coordinate system of which a starting point is the coordinates of the camera, and
  the position at which the predetermined image is displayed is specified by using a line segment or an area represented by coordinates of a plurality of points transformed by the transformation means.

(Supplementary Note 5)

The information processing apparatus described in Supplementary note 3, further comprising display-venue specifying means for specifying an area of the venue in the real-space coordinate system by using the coordinates and the direction acquired by the designation-information acquisition means, and information about a shape of a venue where displaying is performed.

(Supplementary Note 6)

The information processing apparatus described in any one of Supplementary notes 1 to 5, wherein when a new image of the object is acquired by the object-information acquisition means, the relation specifying means specifies the correspondence relation again.

(Supplementary Note 7)

A display system comprising:
an augmented-reality display apparatus including a camera; and
an information processing apparatus, wherein
the information processing apparatus comprises:
model-space storage means for storing a 3D model of a predetermined object present in a real space;
object-information acquisition means for acquiring an image of the object taken by the camera;
relation specifying means for specifying a correspondence relation between a model coordinate system and a real-space coordinate system based on a result of a comparison between the image and the 3D model, the model coordinate system being a coordinate system in a model space in which the 3D model is present, and the real-space coordinate system being a coordinate system in a real space managed by the augmented-reality display apparatus;
transformation means for transforming coordinates in the model coordinate system for specifying a position at which a predetermined image is displayed into coordinates in the real-space coordinate system by using the correspondence relation specified by the relation specifying means; and
coordinate notification means for notifying the augmented-reality display apparatus of the coordinates transformed by the transformation means, and
the augmented-reality display apparatus includes display control means for displaying the predetermined image in an augmented-reality manner based on the coordinates notified from the coordinate notification means.

(Supplementary Note 8)

The display system described in Supplementary note 7, wherein the coordinates in the model coordinate system for specifying the position at which the predetermined image is displayed are specified as a position relative to the object.

(Supplementary Note 9)

The display system described in Supplementary note 7, wherein
the augmented-reality display apparatus further comprises:
direction receiving means for receiving designation of a direction in the real-space coordinate system of which a starting point is coordinates of the camera in the real-space coordinate system; and
designation-information notification means for notifying the information processing apparatus of the coordinates of the camera in the real-space coordinate system and the designation of the direction received by the direction receiving means, wherein the coordinates in the model coordinate system for specifying the position at which the predetermined image is displayed are coordinates specified based on the coordinates and the direction notified from the designation-information notification means.

(Supplementary Note 10)

A display method comprising:
acquiring an image of a predetermined object present in a real space taken by a camera of an augmented-reality display apparatus;
specifying a correspondence relation between a model coordinate system and a real-space coordinate system based on a result of a comparison between the image and a 3D model of the object, the model coordinate system being a coordinate system in a model space in which the 3D model is present, and the real-space coordinate system being a coordinate system in a real space managed by the augmented-reality display apparatus;
transforming coordinates in the model coordinate system for specifying a position at which a predetermined image is displayed into coordinates in the real-space coordinate system by using the correspondence relation; and
notifying the augmented-reality display apparatus of the transformed coordinates.

(Supplementary Note 11)

A non-transitory computer readable medium storing a program for causing a computer to perform:
an object-information acquisition step of acquiring an image of a predetermined object present in a real space taken by a camera of an augmented-reality display apparatus;
a relation specifying step of specifying a correspondence relation between a model coordinate system and a real-space coordinate system based on a result of a comparison between the image and a 3D model of the object, the model coordinate system being a coordinate system in a model space in which the 3D model is present, and the real-space coordinate system being a coordinate system in a real space managed by the augmented-reality display apparatus;
a transformation step of transforming coordinates in the model coordinate system for specifying a position at which a predetermined image is displayed into coordinates in the real-space coordinate system by using the correspondence relation; and
a notification step of notifying the augmented-reality display apparatus of the transformed coordinates.

Although the present invention is explained above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent application No. 2019-064637, filed on Mar. 28, 2019, the disclosure of which is incorporated herein in its entirety by reference.

REFERENCE SIGNS LIST

1 DISPLAY SYSTEM
10 INFORMATION PROCESSING APPARATUS
11 NETWORK INTERFACE
12 MEMORY
13 PROCESSOR

20 AUGMENTED-REALITY DISPLAY APPARATUS
21 NETWORK INTERFACE
22 MEMORY
23 PROCESSOR
24 SPACE RECOGNITION SENSOR
25 CAMERA
26 IMU
27 DISPLAY
101 MODEL-SPACE STORAGE UNIT
102 OBJECT-INFORMATION ACQUISITION UNIT
103 IMAGE RECOGNITION UNIT
104 RELATED SPECIFYING UNIT
105 TRANSFORMATION UNIT
106 DESIGNATION-INFORMATION ACQUISITION UNIT
107 REFERENCE-POSITION CALCULATION UNIT
108 COORDINATE NOTIFICATION UNIT
201 SPACE MANAGEMENT UNIT
202 IMAGE TRANSMITTING UNIT
203 OPERATION RECEIVING UNIT
204 DESIGNATION-INFORMATION NOTIFICATION UNIT
205 DISPLAY CONTROL UNIT
500 INFORMATION PROCESSING APPARATUS
501 MODEL-SPACE STORAGE UNIT
502 OBJECT-INFORMATION ACQUISITION UNIT
503 RELATION DESIGNATION UNIT
504 TRANSFORMATION UNIT
505 COORDINATE NOTIFICATION UNIT

What is claimed is:

1. An information processing apparatus comprising:
at least one memory storing instructions and a 3D (three-dimensional) model of an object present in a real space; and
at least one processor configured to execute the instructions stored in the memory to:
acquire an image of the object taken by a camera of an augmented-reality display apparatus together with coordinates of the camera and a direction of the camera, the augmented-reality display apparatus being an apparatus that displays an augmented-reality image in the real space in a superimposed manner;
specify a correspondence relation between a model coordinate system and a real-space coordinate system based on the coordinates of the camera, the direction of the camera, and a result of a comparison between the image of the object and the 3D model, the model coordinate system being a coordinate system in a model space in which the 3D model is present, and the real-space coordinate system being a coordinate system in the real space managed by the augmented-reality display apparatus;
acquire a plurality of sets that each of which is composed of the coordinates of the camera in the real-space coordinate system and the direction in the real-space coordinate system of which the starting point is the coordinates of the camera, the direction of each of the plurality of sets being designated by a user of the augmented-reality display apparatus;
transform coordinates in the model coordinate system for specifying a position at which the augmented-reality image is displayed into coordinates in the real-space coordinate system by using the specified correspondence relation; and
notify the augmented-reality display apparatus of the transformed coordinates to cause the augmented-reality display apparatus to display the augmented-reality image, wherein
the coordinates in the model coordinate system for specifying the position at which the augmented-reality image is displayed are coordinates specified based on the acquired coordinates and the acquired direction, and
the position at which the augmented-reality image is displayed is specified by using a line segment or an area represented by transformed coordinates of a plurality of points, the transformed coordinates of the plurality of points being coordinates specified based on the plurality of sets.

2. The information processing apparatus according to claim 1, wherein the coordinates in the model coordinate system for specifying the position at which the augmented-reality image is displayed are specified as a position relative to the object.

3. The information processing apparatus according to claim 1, wherein the processor is configured to execute the instructions to, when a new image of the object is acquired, specify the correspondence relation again.

4. An information processing apparatus comprising:
at least one memory storing instructions and a 3D (three-dimensional) model of an object present in a real space; and
at least one processor configured to execute the instructions stored in the memory to:
acquire an image of the object taken by a camera of an augmented-reality display apparatus together with coordinates of the camera and a direction of the camera, the augmented-reality display apparatus being an apparatus that displays an augmented-reality image in the real space in a superimposed manner;
specify a correspondence relation between a model coordinate system and a real-space coordinate system based on the coordinates of the camera, the direction of the camera, and a result of a comparison between the image of the object and the 3D model, the model coordinate system being a coordinate system in a model space in which the 3D model is present, and the real-space coordinate system being a coordinate system in the real space managed by the augmented-reality display apparatus;
acquire the coordinates of the camera in the real-space coordinate system and designation of the direction in the real-space coordinate system of which a starting point is the coordinates of the camera;
transform coordinates in the model coordinate system for specifying a position at which the augmented-reality image is displayed into coordinates in the real-space coordinate system by using the specified correspondence relation;
notify the augmented-reality display apparatus of the transformed coordinates to cause the augmented-reality display apparatus to display the augmented-reality image; and
specify in the real-space coordinate system an area of a venue where displaying is performed by using the acquired coordinates and the acquired direction, and information about a shape of the venue, wherein
the coordinates in the model coordinate system for specifying the position at which the augmented-reality image is displayed are coordinates specified based on the acquired coordinates and the acquired direction.

5. A display method comprising:

acquiring, by a processor, an image of an object present in a real space taken by a camera of an augmented-reality display apparatus together with coordinates of the camera and a direction of the camera, the augmented-reality display apparatus being an apparatus that displays an augmented-reality image in the real space in a superimposed manner;

specifying, by the processor, a correspondence relation between a model coordinate system and a real-space coordinate system based on the coordinates of the camera, the direction of the camera, and a result of a comparison between the image of the object and a 3D model of the object, the model coordinate system being a coordinate system in a model space in which the 3D model is present, and the real-space coordinate system being a coordinate system in the real space managed by the augmented-reality display apparatus;

acquiring, by a processor, a plurality of sets that each of which is composed of the coordinates of the camera in the real-space coordinate system and the direction in the real-space coordinate system of which the starting point is the coordinates of the camera, the direction of each of the plurality of sets being designated by a user of the augmented-reality display apparatus;

transforming, by the processor, coordinates in the model coordinate system for specifying a position at which the augmented-reality image is displayed into coordinates in the real-space coordinate system by using the correspondence relation; and notifying, by the processor, the augmented-reality display apparatus of the transformed coordinates to cause the augmented-reality display apparatus to display the augmented-reality image, wherein the coordinates in the model coordinate system for specifying the position at which the augmented-reality image is displayed are coordinates specified based on the acquired coordinates and the acquired direction, and the position at which the augmented-reality image is displayed is specified by using a line segment or an area represented by transformed coordinates of a plurality of points, the transformed coordinates of the plurality of points being coordinates specified based on the plurality of sets.

* * * * *